United States Patent [19]
Sugaya et al.

[11] 3,986,210
[45] Oct. 12, 1976

[54] MAGNETIC HEAD DEVICE USING PRINTED CIRCUIT TECHNIQUES

[75] Inventors: Hiroshi Sugaya, Suita; Takeshi Ishihara, Neyagawa; Fukashi Kobayashi, Hirakata; Kenji Kanai, Neyagawa, all of Japan

[73] Assignee: Matsushita Electric Industrial Co., Ltd., Osaka, Japan

[22] Filed: Feb. 13, 1974

[21] Appl. No.: 442,197

[30] Foreign Application Priority Data
Feb. 20, 1973 Japan.............................. 48-20875
Feb. 20, 1973 Japan.............................. 48-20876
Aug. 11, 1973 Japan.............................. 48-90388

[52] U.S. Cl............................... 360/123; 360/125; 360/63; 360/121
[51] Int. Cl.²...................... G11B 5/16; G11B 5/25; G11B 5/20
[58] Field of Search ........... 360/122, 126, 125, 112, 360/63, 121, 123

[56] References Cited
UNITED STATES PATENTS
3,443,036  5/1969  Maass ................................. 360/112
3,515,817  6/1970  Tawara ............................... 360/110
3,564,522  2/1971  Stevens ................................ 360/63
3,601,871  8/1971  Pierce ................................. 360/125
3,662,119  5/1972  Romankiw ........................... 360/123
3,668,670  6/1972  Anderson ............................ 360/112
3,672,043  6/1972  Trimble .............................. 360/125

OTHER PUBLICATIONS
"Magnetic Head Structure," by Siegl, IBM Tech. Disc. Bul.; vol. 13, No. 6, Nov., 1970, p. 1547.

*Primary Examiner*—Bernard Konick
*Assistant Examiner*—Alan Faber
*Attorney, Agent, or Firm*—Stevens, Davis, Miller & Mosher

[57] ABSTRACT

A small magnetic head is directly formed on a semiconductor substrate by using diffusion or evaporation techniques. A number of such small magnetic heads may be formed on the same substrate with high precision and high uniformity, and this is useful for constructing a multi-track head. If desired, a semiconductor integrated circuit may also be formed directly on the aforesaid semiconductor substrate.

4 Claims, 14 Drawing Figures

FIG. I
PRIOR ART
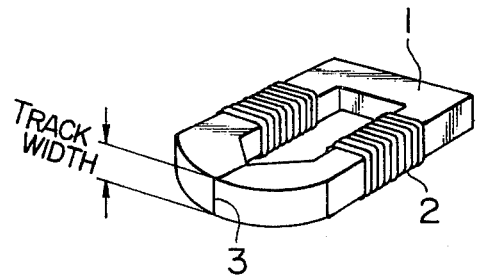
FIG. 2
PRIOR ART
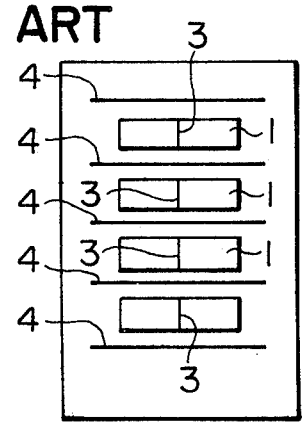
FIG. 3
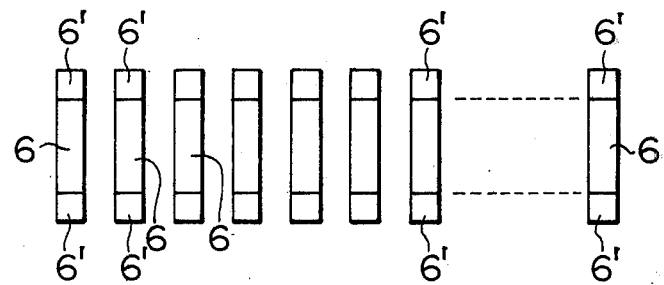

MAGNETIC HEAD DEVICE USING PRINTED CIRCUIT TECHNIQUES

This invention relates to magnetic heads for recording signals on or reproducing signals from magnetic recording mediums.

The magnetic heads presently in widespread use are developed from a prototype ring type head invented in 1935 by Schiller in Germany. This type of magnetic head has a construction comprising a core of a magnetic material, a coil wound on the core and a gap formed in part of the magnetic circuit constituted by the core, and it constitutes a unit head.

An arrangement of a plurality of such unit heads stacked together with spacers inserted between adjacent unit heads and with the gaps of the individual unit heads aligned to one another is called a multi-track head, and there have been proposed various inventions concerning the way of arrangement and construction of the multi-track head.

The most extensively used core type is a lamination of thin permalloy plates 0.05 to 0.2 mm thick laminated with insulating varnish or the like. Some simple cores are constituted by a single permalloy plate. In either case, it is most important for the core to minimize leakage flux, and to this end many recent cores use ferrites.

The most serious problem heretofore encountered in the manufacture of the magnetic head, is that very small component parts must be assembled manually, so that the yield is low. Particularly, in the case of multi-track heads whose use promises to increase, it is simply considered that the yield of manufacture of $n$ tracks is reduced to $1/n$. Also, at present the upper limit of the number of tracks per one inch is 40 to 50 tracks due to space required for the coil. However, there is a trend for a greater number of tracks demanded per inch.

The present invention aims to give an effective solution to the above problems.

An object of the invention is to provide a very small magnetic head, which can be readily manufactured with high precision.

A second object of the invention is to provide a multi-track head comprising a plurality of small magnetic heads formed on the same substrate with high precision and high uniformity.

A third object of the invention is to provide a small magnetic head formed on a substrate, on which is also formed an electric circuit.

According to the invention, a plurality of small magnetic heads can be formed on the same semiconductor substrate with high precision and high uniformity, and this is particularly advantageous for the manufacture of multi-track heads. Also, it is possible to increase the conversion efficiency of the magnetic head and improve high frequency characteristics thereof, thus permitting an improvement in the performance of the magnetic head. Further, sufficient magnetization of the recording medium can be ensured. Furthermore, by forming the associated electric circuit on the same substrate with the head the signal-to-noise ratio can be increased.

The above and other objects of the invention, together with the construction and effects of the invention, will become more apparent from the following description taken in conjunction with the accompanying drawings, in which:

FIG. 1 is a perspective view of a prior art ring type magnetic head;

FIG. 2 is a front view of a prior art multi-track head;

FIGS. 3 to 5 are plan views illustrating an example of manufacture of a magnetic head according to the invention;

Figure 4:
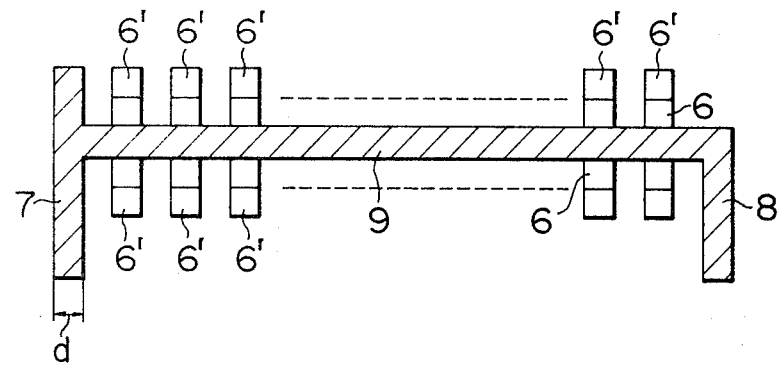

The afore-mentioned prior art ring type magnetic head invented by Scheller has a construction as shown in FIG. 1. In the figure, reference numeral 1 designates a core made of a magnetic material, numeral 2 a coil, and numeral 3 a magnetic gap provided in part of the magnetic circuit constituted by the core. This construction of head is regarded as a unit head.

FIG. 2 shows an example of the aforementioned multi-track assembly consisting of a plurality of unit heads having the same construction and stacked together with spacers 4 interposed between adjacent head units.

The prior art magnetic head constructions shown in FIGS. 1 and 2 present the aforesaid various problems.

An embodiment of the magnetic head according to the invention, together with the method of manufacture of it, will now be described.

Figure 5:
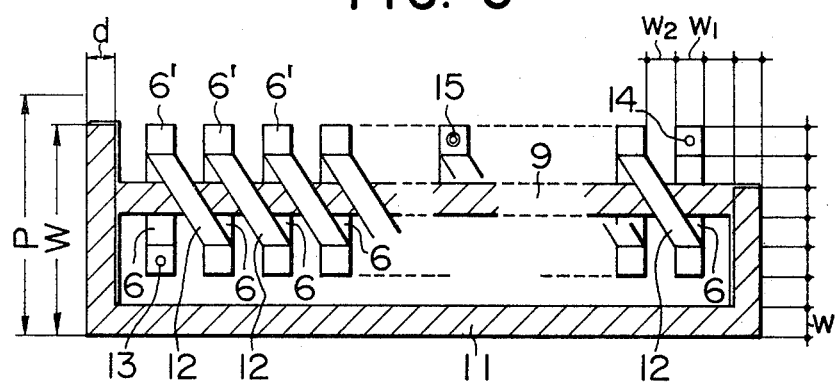
Figure 6:
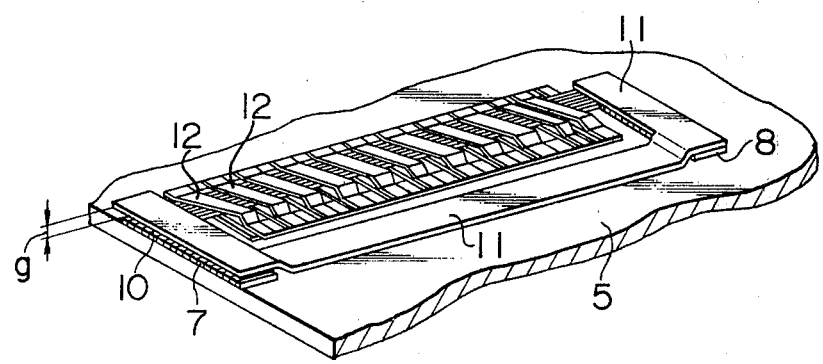
FIG. 6 is a perspective view showing an embodiment of the magnetic head according to the invention.
Figure 7:
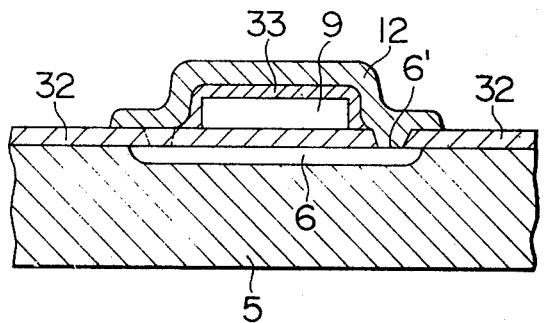
FIG. 7 is a fragmentary sectional view, to an enlarged scale, showing the same magnetic head.

Referring now to FIGS. 3 to 7, substantially parallel lower coil segments 6, shown in FIG. 3, which constitute part of a coil of the head, are formed on or in a semiconductor substrate 5 such as a silicon substrate. They may be formed by means of deposition, evaporation, diffusion, anodic oxidation, or implantation of a conductive material. Then, an insulating layer 32 of silicon dioxide film is formed on the wafer by the thermal oxidation method or epitaxial growth method, or alternatively the insulating layer 32 may be formed by evaporating silicon dioxide (see FIG. 7). Then, a magnetic material layer 9 constituting the core of the magnetic head and crossing the center of the lower coil segments 6 is formed, as shown in FIG. 4. This magnetic material layer 9 may be formed by vacuum evaporation or sputtering of such magnetic material as permalloys or Sendust. The magnetic material layer 9 is hook-shaped at opposite ends as indicated at 7 and 8. The hook-shaped portion 7 has a width equal to the required depth $d$ of the gap and a length corresponding to the required track width W. The other hook-shaped portion 8 is deemed to form a rear magnetic gap. The magnetic material layer 9 is then covered with an insulating film 33 such as a silicon dioxide film, as shown in FIG. 7.

Meanwhile, the afore-mentioned insulating film 32 is partly removed by means of selective photo-etching to expose opposite end portions of each lower coil segment 6. Then, the successive lower coil segments 6 are electrically connected in series with conductor segments 12 which may be formed by depositing or evaporating a conducting material such as copper or aluminum, each conductor segment 12 being joined to exposed portions of adjacent lower coil segments 6 on opposite sides of the magnetic material layer 9, as shown in FIG. 5. In this way, a coil having a zig-zag form is formed.

The opposite ends of this zig-zag coil constitute coil terminals 13 and 14, and an end of an intermediate lower coil segment 6 constitutes a tap terminal 15.

In FIGS. 5 and 6, the width of the lower coil segments 6 is indicated at $w_1$, the distance between adjacent lower coil segments at $w_2$, the width of the core at $w$, the width of the gap at $g$, the depth of the gap at $d$, the track width at $W$, and the width dimension of the unit head in the direction of the track width, that is, the pitch, at $P$.

Then, a non-magnetic material layer 10 having a thickness $g$ equal to the width of the gap is provided on the hook-shaped end portion 7. Then, a second magnetic material layer 11 is formed in the manner as described above such that it overlies only the hook-shaped end portions 7 and 8 of the first-mentioned magnetic material layer 9, thus completing the head (as shown in FIG. 6).

An example of the manufacture of a unit head will now be detailed. Where the lower coil segments 6 are formed by depositing a conductive material such as copper or aluminum on the substrate 5 of a non-magnetic material such as glass or silicon and selectively photo-etching the deposited conductive layer, the lower limit of the width $w_1$ of the lower coil segment and the distance $w_2$ between adjacent lower coil segments depends upon the photo-etching technique. This means that a minimum size of the coil section can be obtained if $w_1$ is equal to $w_2$. Subsequently, an insulating layer of a material such as silicon dioxide is formed on the lower coil segments 6 except for end portion 6' thereof. Then, the lower core layer 9 is formed over the lower coil segments 6 by depositing a magnetic material such as permalloys or Sendust and selectively photo-etching the deposited layer. Here, the width $w$ of the core is the minimum width. Then, the lower core layer 9 is covered with an insulating film of such material as silicon dioxide except for the hook-shaped portion 8 constituting the rear butt portion. Thereafter, the upper core layer 11 is formed, for instance by depositing the same magnetic material as the lower core layer and selectively photo-etching the deposited layer such that it overlies only the hook-shaped portions 7 and 8 of the lower core layer, with the spacer layer 10 provided on the hook-shaped portion 7. The width of the upper core layer is also $w$. The track width $W$ constituting the width of the unit head may be minimized by minimizing the width $w$. The lower limit of the latter width again depends upon the photo-etching technique like $w_1$ and $w_2$, and this means that it may be made substantially equal to $w_1$ and $w_2$ to minimize the track width. Thus, for the minimum size of the unit head we may set $$w_1 = w_2 = w,$$
$$W = 7w,$$

and
$$P = W + w + 8w.$$

If the lower limit of the photo-etching width is $w = 10$ μm, the width of the unit head is 70 μm. Also, for minimizing the dimensions of the unit head the distance between each juncture portion 6' and the magnetic material layer 9 or 11 is made to be $w_2$. Further, to this end the lower core layer 9 is formed such that its end portion to be in contact with the recording medium and its portion crossing the lower coil segments 6 form the shape of a figure T, and the area of the lap portions of the lower and upper core layers is made as small as possible.

In view of ensuring full recording of signal on the recording medium, it is necessary to use the magnetic head in a range over which the core is not saturated. This means that it is necessary to meet a condition $$\frac{W \cdot d}{W \cdot t} < \frac{Bs}{\mu_o Hc}$$

where $Hc$ is the coercive force of the recording medium, $Bs$ is the saturation flux density of the core, $t$ is the thickness of the core, and $\mu_o$ is the magnetic permeability of vacuum. Unless at least this condition is satisfied, the core will be saturated before the field in the gap reaches $Hc$, and in such case the recording medium can no longer be sufficiently magnetized.

Figure 8A:
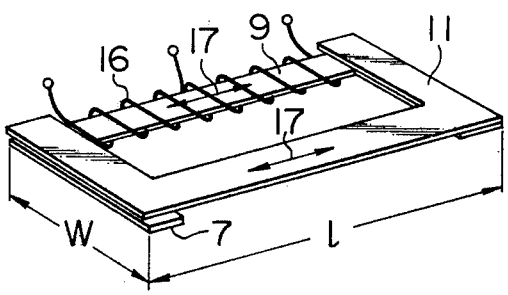
FIG. 8a is a view for illustrating the operation of the magnetic head according to the invention.
Figure 8B:
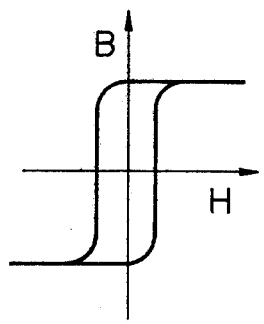
FIGS. 8b and 8c are graphs showing B-H characteristics of a magnetic material.
Figure 8C:
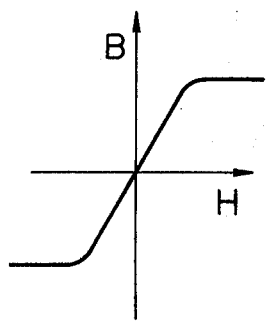

FIG. 8a shows the disposition of the lower and upper core layers 9 and 11. With a signal current impressed upon the signal coil 12 of the unit head signal flux is set up in the direction of the arrows. FIGS. 8b and 8c show B-H characteristics for easy and hard directions of a magnetic material, particularly a permalloy, which is deposited through evaporation in a magnetic field. The magnetic material deposited in a magnetic field features in that residual magnetization in the hard direction, and it is suited to high frequency uses so that the switching speed of inverting magnetization in this direction is high. Thus, the direction 17 of the flux in the unit head according to the invention desirably coincides with the hard direction of the magnetic material.

With the construction described above according to the invention it is possible to reduce the dimension of the unit head in the direction of the track width by making the utmost use of the precision photo-etching technique, and also it is possible to form a number of unit heads arranged in the direction of the track width readily and precisely by also utilizing the photographic techniques. Particularly, it is possible to realize an arrangement of a number of unit heads with high uniformity. Further, while the winding of coil in the manufacture of the prior art magnetic head has been very tedious and called for a great deal of man-hour, according to the invention a coil having a great number of turns may be readily formed.

Furthermore, the magnetic head core according to the invention faces itself only for the area of the gap even if the closed circuit is formed in a planar form, so that leakage flux is small. Thus, a very efficient magnetic head may be obtained. Where the core is constructed from a thin plate, the efficiency is greatly reduced due to the leakage flux, so that a core construction subject to less leakage flux is very important. The usefulness of the invention will thus be appreciated also from this point.

Further, by so arranging that the direction of the signal flux in the core coincides with the hard direction of the magnetic thin plate formed by vapordeposition in a magnetic field or by electrodeposition, it is possible to reduce the effect of residual magnetism of the core and improve the performance of the magnetic head in playback. Further, the period of inversion of magnetization in the hard direction is very short, which is very desirable from the standpoint of improving the high frequency performance of the magnetic head.

In addition, by forming the magnetic head of U-shaped core layers and setting the gap depth, core width and core thickness as in the preceding example, it is possible to obtain a construction capable of sufficiently magnetizing the recording medium and very effective for constructing a multitrack head.

While the preceding embodiment has been concerned with a single track head, a multi-track head may similarly constructed by simultaneously forming a plurality of unit heads on the same substrate with good precision as to the location and dimensions of the individual unit heads.

Figure 9:
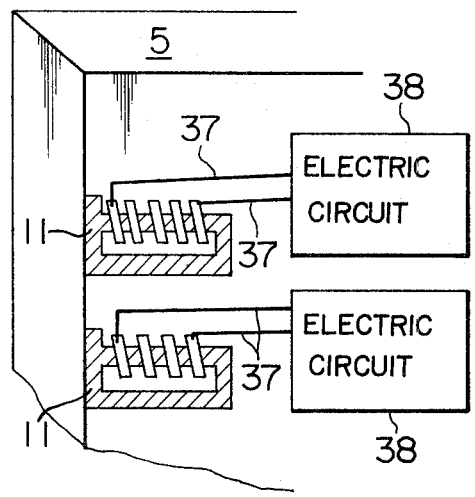
FIG. 9 is a schematic representation of a magnetic head system embodying the invention.

FIG. 9 shows an example of such a multi-track head. In this embodiment, the substrate 5 is a semiconductor, so that leads 37 for the individual unit heads may be formed simultaneously with the formation of the aforementioned lower coil segments 6 by means of diffusion, implantation or vapordeposition. This is very advantageous from the standpoint of the subsequent treatment.

Further, electric circuits 38 such as switching circuits and amplifiers may be formed on the substrate 5 by using the integrated circuit technique. Thus, it is possible to reduce the length of leads from the magnetic head to the associated electric circuit so as to reduce interference among leads for bettering the signal-to-noise ratio.

Figure 10:
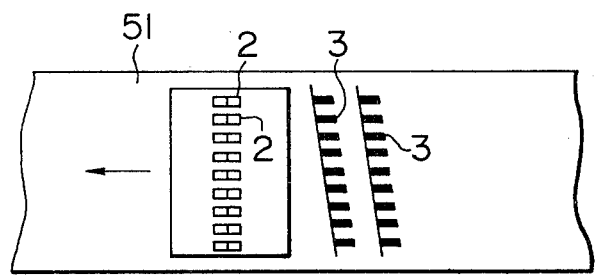
FIG. 10 is a schematic representation of another embodiment of the magnetic head system according to the invention.

FIG. 10 shows a typical multi-track head embodying the invention. It has a number of unit heads arranged in a row in the direction of width of magnetic tape 51. These magnetic heads are operated one after another to record signals as predetermined traces 53 on the magnetic tape 51 in a direction different from the direction of travel of the tape.

In this system, the unit heads 52 have to be arranged close to one another. Also, problems are encountered in connection with how to dispose with leads to and from the unit heads.

Figure 11:
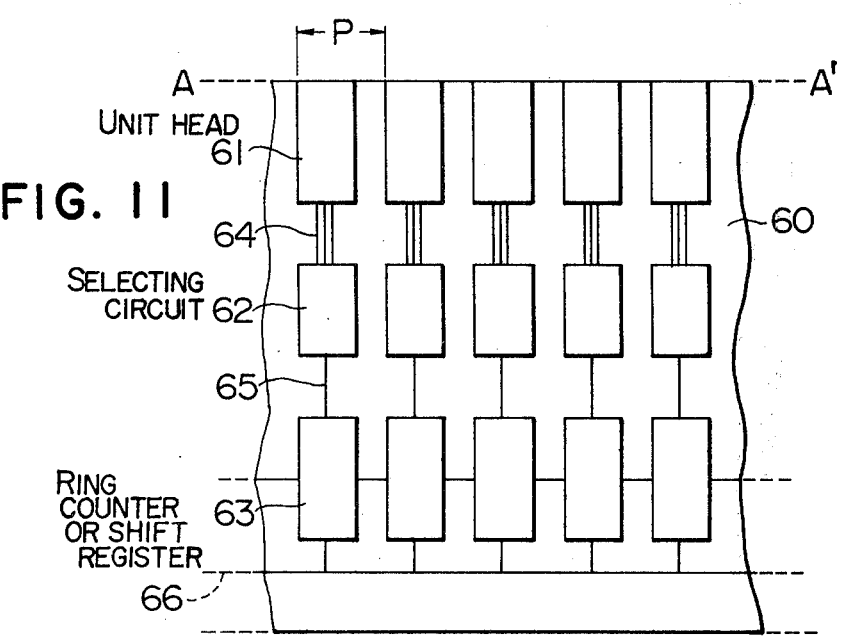
FIG. 11 is a view schematically illustrating the essential part of the same embodiment.

In FIG. 11, numeral 61 designates unit heads of the above construction. They are arranged on substrate 60 along line A—A' in contact with the recording medium at a uniform interval, that is, a pitch P.

These magnetic heads 61 are connected through leads 64 to respective selecting circuit sections 62, which are controlled by respective ring counters of shift registers 63 driven by clock pulses impressed thereon through a lead 66, so that the magnetic heads 61 are driven one after another.

To record a video signal with this construction, it is necessary to record about 300 bits of picture elements in one horizontal scan period of 63.5 $\mu$sec. This is possible with a clock pulse frequency of about 5 MHz.

Since the individual unit heads here are of the above construction and a semiconductor substrate such as a silicon substrate is used as the non-magnetic substrate, it is possible to form such active elements as selecting diodes and transistors on the silicon wafer.

Figure 12:
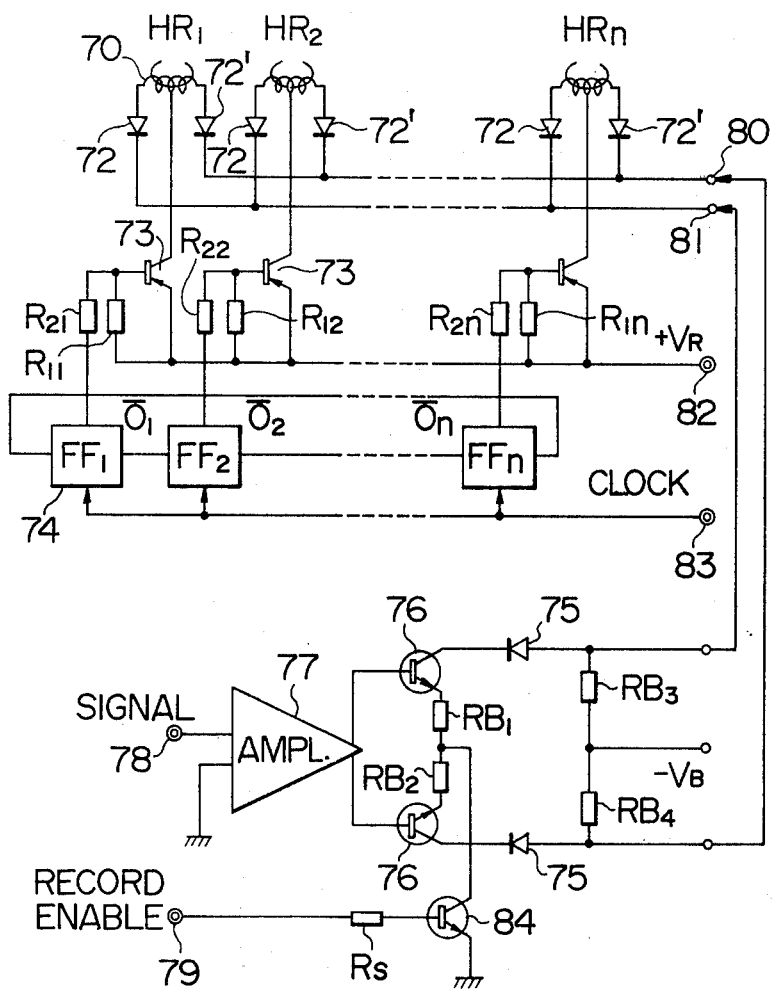
FIG. 12 is an electric connection diagram of the same embodiment.

FIG. 12 shows a specific electric circuit for recording. Designated at $HR_1$, $HR_2$, . . . , $HR_n$ are magnetic heads of the above construction and having respective balance type signal coils 70. The neutral point of each signal coil 70 is connected through a head selection switching transistor 73 to a common power supply 82. Also, head selecting diodes 72 and 72' are connected to the two extreme terminals of each head coil 70 forwardly with respect to the direction of current. The diodes 72 of the individual head coils 70 are connected to a common terminal 80, while the diodes 72' are connected to the other common terminal 81, and a signal recording amplifier signal is connected between these common terminals 80 and 81. To the control input terminal of each switching transistor 73 is supplied the output of an associated ring counter or shift register 74, and clock pulses appearing at a clock signal terminal 83 are supplied to the individual ring counters or shift registers. The signal recording amplifier comprises switching diodes 75, an amplifying transistors 76, a pre-amplifier 77, and a recording control transistor 84. The signal recording amplifier is controlled by a signal supplied to a signal input terminal 78 to supply signal current to each unit head. The individual unit heads are selected one by one as the head selecting switching transistors 73 are operated by the ring counters or shift registers 74 at the frequency of the clock signal appearing at the clock signal terminal 83, whereby signals from the individual unit heads are successively recorded on the recording medium. In this construction, the signal recording amplifier can have a Class A amplifier function, so that a video signal as the input signal can be recorded through amplitude modulation.

For effecting playback with the coil type multi-track head of FIG. 12, to change the flux of the signal source it is necessary to change the reluctance of the core of each unit head by impressing a bias field on the core. To this end, for instance, a bias coil penetrating the core of each unit head may be provided to detect the residual flux corresponding to the position of the selected head from the recording medium.

What we claim is:
1. A magnetic head comprising:
   a semiconductor substrate;
   a plurality of elongated substantially parallel and coplanar first conductors formed in and contiguous with the surface of said substrate by diffusion or implantation and defining substantially one half of a magnetic coil;
   a first magnetic material layer evaporated on said substrate, said first layer including an elongated central portion extending over and insulated from said plurality of first coil half conductors and an elongated first end portion extending substantially normally to said elongated central portion;
   a plurality of elongated substantially parallel and coplanar second conductors formed on said substrate, each second conductor extending over and insulated from said central portion of said first magnetic material layer between and in contact with one end portion of one first coil half conductor and an opposite end portion of a next adjacent first coil half conductor to form a second half of said magnetic coil;
   a non-magnetic material formed over said first end portion of said first magnetic material layer to a depth which defines a magnetic head gap; and
   a second magnetic material layer formed on said substrate and having one end portion extending over said non-magnetic material layer and said first end portion of said first magnetic material layer and a second end portion extending over a second end portion of said first magnetic material layer, said first and second magnetic material layers being magnetically coupled to each other at their respective end portions, the first end portions of said magnetic material layers and the interposed nonmagnetic material defining a magnetic head face for magnetic engagement with a magnetic recording/reproducing medium.

2. The magnetic head according to claim 1, wherein: said first magnetic material layer is substantially U-shaped,
said first end portion forming one leg of said U and having a portion extending beyond the base of the U formed by said elongated central portion; and
said second magnetic material layer is substantially U-shaped in facing relation to said U-shaped first magnetic layer, the legs of said U-shaped second magnetic layer overlying the legs of said U-shaped first magnetic layer.

3. The magnetic head according to claim 1, wherein said first and second magnetic material layers face each other only at their opposite end portions.

4. The magnetic head according to claim 1, wherein said first and second magnetic material layers are made from an anisotropic magnetic material, the hard direction of said magnetic material being adapted to coincide with the direction of signal magnetic flux.

* * * * *